United States Patent
Hiraoka

(10) Patent No.: US 9,802,413 B2
(45) Date of Patent: Oct. 31, 2017

(54) PHOTOPOLYMERIZABLE INKJET INK

(71) Applicant: Takao Hiraoka, Kanagawa (JP)

(72) Inventor: Takao Hiraoka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 110 days.

(21) Appl. No.: 14/349,027

(22) PCT Filed: Oct. 30, 2012

(86) PCT No.: PCT/JP2012/078555
§ 371 (c)(1),
(2) Date: Apr. 1, 2014

(87) PCT Pub. No.: WO2013/069580
PCT Pub. Date: May 16, 2013

(65) Prior Publication Data
US 2014/0240414 A1    Aug. 28, 2014

(30) Foreign Application Priority Data
Nov. 7, 2011  (JP) .................................. 2011-243072

(51) Int. Cl.
B41J 2/175       (2006.01)
C09D 11/101     (2014.01)
C09D 11/30      (2014.01)

(52) U.S. Cl.
CPC ......... *B41J 2/17503* (2013.01); *C09D 11/101* (2013.01); *C09D 11/30* (2013.01)

(58) Field of Classification Search
None
See application file for complete search history.

(56) References Cited

U.S. PATENT DOCUMENTS

2004/0024078 A1* 2/2004 Itoh .................. C09D 11/101
522/1
2004/0099170 A1   5/2004 Takabayashi
(Continued)

FOREIGN PATENT DOCUMENTS

EP   1 788 045 B1   4/2009
EP   2 669 343 A1  12/2013
(Continued)

OTHER PUBLICATIONS

Extended European Search Report issued May 4, 2015 in Patent Application No. 12848209.8.
(Continued)

*Primary Examiner* — An Do
*Assistant Examiner* — Renee I Wilson
(74) *Attorney, Agent, or Firm* — Oblon, McClelland, Maier & Neustadt, L.L.P.

(57) ABSTRACT

To provide a photopolymerizable inkjet ink, which contains photopolymerizable monomers containing at least one selected from the following compound group (A) compounds of which are negative for skin sensitization, and at least one selected from the following compound group (B) compounds of which are negative for skin sensitization, wherein the compound group (A) is a compound group consisting of caprolactone-modified dipentaerythritol hexaacrylate, polyethoxylated tetramethylol methane tetraacrylate, ethylene oxide-modified bisphenol A diacrylate, caprolactone-modified hydroxy pivalic acid neopentyl glycol diacrylate, polypropylene glycol diacrylate [$CH_2{=}CH{-}CO{-}(OC_3H_6)n{-}OCOCH{=}CH_2$ ($n{\approx}12$)], hydroxyethyl acryl amide, trimethylol propane trimethacrylate, and tricyclodecane dimethanol dimethacrylate, and the compound group (B) is a compound group consisting of ethylene oxide-modified phenolacrylate, isostearyl acrylate,
(Continued)

ethylene oxide-modified trimethylol propane trimethacrylate, stearyl methacrylate, and glycerin dimethacrylate.

17 Claims, 2 Drawing Sheets

(56) References Cited

U.S. PATENT DOCUMENTS

| | | | |
|---|---|---|---|
| 2004/0145639 A1 | 7/2004 | Noutary | |
| 2009/0244116 A1* | 10/2009 | Ohnishi | C09D 11/101 347/6 |
| 2011/0118377 A1 | 5/2011 | Hauck et al. | |
| 2012/0086762 A1 | 4/2012 | Noguchi et al. | |
| 2012/0147103 A1 | 6/2012 | Hasegawa et al. | |
| 2012/0176456 A1 | 7/2012 | Maekawa et al. | |
| 2012/0200648 A1 | 8/2012 | Hiraoka et al. | |
| 2013/0321539 A1 | 12/2013 | Hiraoka | |
| 2014/0125744 A1 | 5/2014 | Hiraoka | |
| 2015/0126636 A1 | 5/2015 | Hiraoka | |

FOREIGN PATENT DOCUMENTS

| | | |
|---|---|---|
| JP | 06-090540 | 11/1994 |
| JP | 2003-192943 | 7/2003 |
| JP | 2004-175906 A | 6/2004 |
| JP | 2004-182808 | 7/2004 |
| JP | 2004-526820 | 9/2004 |
| JP | 2009-233978 | 10/2009 |
| JP | 2011-521029 | 7/2011 |
| JP | 2011-178981 | 9/2011 |
| JP | 2012-251123 | 12/2012 |
| RU | 2 294 553 C2 | 2/2007 |
| WO | WO2012/153867 | 11/2012 |
| WO | WO 2012/157690 A1 | 11/2012 |
| WO | WO 2013/172480 A1 | 11/2013 |

OTHER PUBLICATIONS

International Search Report Issued Nov. 27, 2012 for counterpart International Patent Application No. PCT/JP2012/078555 filed Oct. 30, 2012.

U.S. Appl. No. 14/225,696, filed Mar. 26, 2014 Inventor: Hiraoka.

Decision on Grant issued Nov. 6, 2015 in Russian Patent Application No. 2014123371/05 (with English language translation).

Office Action issued Sep. 18, 2015 in Korean Patent Application No. 10-2014-7012032 (with English language translation).

Office Action dated Jun. 7, 2016, in Korean Patent Application 10-2014-7012032 (with English Translation).

* cited by examiner

PHOTOPOLYMERIZABLE INKJET INK

CROSS REFERENCE TO RELATED APPLICATIONS

The present application is a 35 U.S.C. §371 national stage patent application of International patent application PCT/JP2012/078555, filed on Oct. 30, 2012, published as WO/2013/069580 on May 16, 2013, the text of which is incorporated by reference, and claims the benefit of the filing date of Japanese application No. 2011-243072, filed on Nov. 7, 2011, the text of which is also incorporated by reference.

TECHNICAL FIELD

The present invention relates to a photopolymerizable inkjet ink.

BACKGROUND ART

Photopolymerizable inkjet inks using (meth)acrylic acid esters and photopolymerizable inkjet inks using a combination of (meth)acrylic acid esters and vinyl ethers have been widely known (see PTL 1 etc.).

However, many of monomers used in conventional photopolymerizable inkjet inks are toxic. Especially, most of (meth)acrylic acid esters, which are readily available with low cost, have high toxicity in terms of skin sensitivity, which causes allergy reactions with skin upon contact with them. Conventional art has not provided any solution to this problem.

CITATION LIST

Patent Literature

PTL 1: Japanese Patent Application Laid-Open (JP-A) No. 2004-526820

SUMMARY OF INVENTION

Technical Problem

The present invention aims to solve the aforementioned problems in the art, and to achieve the following object. An object of the present invention is to provide a photopolymerizable inkjet ink, which has no problem of skin sensitization, and achieve both low viscosity and improved curing property.

Solution to Problem

As a result of the studies conducted by the present inventors, they have found several (meth)acrylic acids and (meth)acryl amides, which do not have a problem of skin sensitization. When an ink is produced by using these monomers and imparting curing property to a level of practical use, however, it has been found that a resulting ink has high viscosity compared to commonly used inkjet inks. Therefore, such ink cannot be ejected as inkjets without use of an ejection heat capable of heating to the temperature high enough to make the ink low viscous. Moreover, it is necessary to set the internal pressure of the head considerably high to eject the ink. Accordingly, there are problem with the aforementioned ink that stable ejection performances cannot be obtained easily.

The present inventors have conducted diligent studies to solve the aforementioned various problems and to achieve the aforementioned object, and the studies have lead to the following insights. Based on such insights, the present invention has been accomplished. Namely, the insights of the present inventors are that a photopolymerizable inkjet ink containing at least one selected from the following compound group (A), compounds of which are negative for skin sensitization, and at least one selected from the following compound group (B), compounds of which are negative for skin sensitization, has not a problem of skin sensitization, and can achieve both low viscosity and improved curing property.

The present invention is based upon the insights of the present inventors, and means for solving the aforementioned problems are as follows:

A photopolymerizable inkjet ink, which contains:
photopolymerizable monomers containing at least one selected from the following compound group (A) compounds of which are negative for skin sensitization, and at least one selected from the following compound group (B) compounds of which are negative for skin sensitization,
wherein the compound group (A) is a compound group consisting of caprolactone-modified dipentaerythritol hexaacrylate, polyethoxylated tetramethylol methane tetraacrylate, ethylene oxide-modified bisphenol A diacrylate, caprolactone-modified hydroxy pivalic acid neopentyl glycol diacrylate, polypropylene glycol diacrylate $[CH_2=CH-CO-(OC_3H_6)_n-OCOCH=CH_2$ $(n \approx 12)]$, hydroxyethyl acryl amide, trimethylol propane trimethacrylate, and tricyclodecane dimethanol dimethacrylate, and
the compound group (B) is a compound group consisting of ethylene oxide-modified phenol acrylate, isostearyl acrylate, ethylene oxide-modified trimethylol propane trimethacrylate, stearyl methacrylate, and glycerin dimethacrylate.

Advantageous Effects of Invention

The present invention can provide a photopolymerizable inkjet ink, which has no problem of skin sensitization, and achieve both low viscosity and improved curing property.

Further, printed matter produced with the ink of the present invention has no problem of skin sensitization even if an uncured monomer component is remained and therefore safe, and skin sensitization is not caused even when the printed matter is touched with hands or fingers. Accordingly, safe printed matter can be provided.

DESCRIPTION OF EMBODIMENTS (Photopolymerizable Inkjet Ink)

Figure 1:
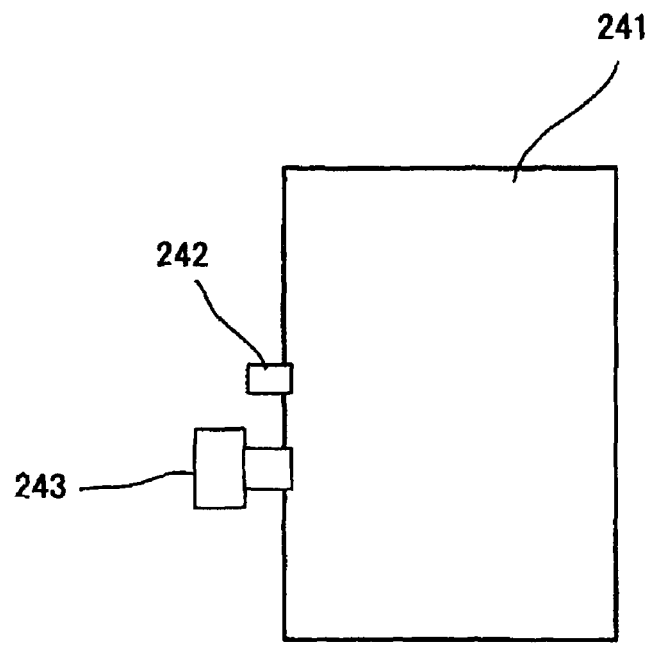
FIG. 1 is a schematic diagram illustrating one example of an ink bag of the ink cartridge of the present invention.

The photopolymerizable inkjet ink (may also referred to merely as "ink" hereinafter) of the present invention contains at least photopolymerizable monomers, and may further contain other components, such as a photoradical polymerization initiator, a polymerization accelerator, and a colorant, if necessary.

<Photopolymerizable Monomers>

The photopolymerizable monomers contain at least one selected from the following compound group (A), compounds of which are negative for skin sensitization, and at least one selected from the following compound group (B), compounds of which are negative for skin sensitization, and may further contain at least on selected from the following compound group (C), and other photopolymerizable monomers, if necessary.

Compound group (A): a compound group consisting of caprolactone-modified dipentaerythritol hexaacrylate, polyethoxylated tetramethylol methane tetraacrylate, ethylene oxide-modified bisphenol A diacrylate, caprolactone-modified hydroxy pivalic acid neopentyl glycol diacrylate, polypropylene glycol diacrylate [$CH_2$=CH—CO—($OC_3H_6$)n-OCOCH=$CH_2$ (n≈12)], hydroxyethyl acryl amide, trimethylol propane trimethacrylate, and tricyclodecane dimethanol dimethacrylate Compound group (B): a compound group consisting of ethylene oxide-modified phenolacrylate, isostearyl acrylate, ethylene oxide-modified trimethylol propane trimethacrylate, stearyl methacrylate, and glycerin dimethacrylate Compound group (C): a compound group consisting of triethylene glycol divinyl ether, hydroxybutyl vinyl ether, ethyl vinyl ether, t-butyl methacrylate, n-pentyl methacrylate, and n-hexyl methacrylate Note that, "n≈12" in the description of the polypropylene glycol diacrylate [$CH_2$=CH—CO—($OC_3H_6$)n-OCOCH=$CH_2$ (n≈12)] means that the average value of "n" is 12 though compounds having different values of "n" are present as a mixture in the polypropylene glycol diacrylate. Similarly, the "n≈" described in the descriptions below also means the average value.

The present invention will be explained in details hereinafter.

Conventionally, there has not been a photopolymerizable monomer that can be used as a material for a photopolymerizable inkjet ink and is negative for skin sensitization, and that can achieve both sufficiently low viscosity and sufficient curing property when used alone. With monomers that are negative for skin sensitization, studied is a method for blending the monomer having excellent curing property but having high viscosity, and the monomer having low viscosity but having insufficient curing property with a desirable balance and using the mixture.

As a result, the compound group (B) has been found as photopolymerizable monomers being negative for skin sensitization and having low viscosity. Then, both low viscosity and improved curing property have been successfully achieved by using the compound group (B) in combination with the compound group (A), which is previously discovered, and compounds of which are negative for skin sensitization, and have desirable curing property but having high viscosity.

An amount of the compound group (A) in the photopolymerizable monomers is not appropriately selected depending on the intended purpose without any limitation, but it is preferably 5% by mass to 95% by mass, more preferably 10% by mass to 50% by mass. An amount of the compound group (B) in the photopolymerizable monomers is not appropriately selected depending on the intended purpose without any limitation, but it is preferably 5% by mass to 95% by mass, more preferably 10% by mass to 85% by mass.

A blending ratio (A)/(B) (mass ratio) of the compound group (A) and the compound group (B) is not appropriately selected depending on the intended purpose without any limitation, but it is preferably 5/95 to 95/5, more preferably 15/85 to 85/15.

Here, the photopolymerizable monomer negative for skin sensitization refers to a compound that is evaluated as at least one of the following skin sensitization evaluations (1) to (3):

(1) a compound having a Stimulation Index (SI value) of less than 3, where the Stimulation Index indicates the extent of sensitization as measured by a skin sensitization test based on the LLNA (Local Lymph Node Assay);
(2) a compound evaluated as "negative for skin sensitization" or "no skin sensitization" in its MSDS (Material Safety Data Sheet); and
(3) a compound evaluated as "negative for skin sensitization" or "without skin sensitization" in literature [e.g., Contact Dermatitis 8 223-235 (1982)].

Regarding the above (1), the compound having a SI value of less than 3 is considered negative for skin sensitization as described in literatures, for example, "Functional Material" (Kino Zairyou) 2005, September, Vol. 25, No. 9, p. 55. The lower SI value means lower skin sensitization. Thus, in the present invention, a monomer or an oligomer having lower SI value is preferably used. The SI value of the monomer or the oligomer used is less than 3, preferably 2 or lower, more preferably 1.6 or lower.

<<Compound Group (C)>>

As for the compound group (C), vinyl ethers negative for skin sensitization are used, and examples of the compound group (C) include a compound group consisting of triethylene glycol divinyl ether, hydroxybutyl vinyl ether, ethyl vinyl ether, t-butyl methacrylate, n-pentyl methacrylate, and n-hexyl methacrylate.

The ink of the present invention preferably contains, as a photopolymerizable monomer, at least one selected from the compound group (C), compounds of which are negative for skin sensitization.

At least one selected from the compound group is not appropriately selected depending on the intended purpose without any limitation, but among the compound group (C), triethylene glycol divinyl ether is preferable, because it is sufficiently low viscous, has a boiling point that is not excessively low, and is easily handled under ambient temperature and pressure. Moreover, t-butyl methacrylate, n-pentyl methacrylate, and n-hexyl methacrylate are also preferable because they are negative for skin sensitization and have sufficiently low viscosity. An amount of the compound group (C) in the photopolymerizable monomers is not appropriately selected depending on the intended purpose without any limitation, but it is preferably 10% by mass to 90% by mass, more preferably 40% by mass to 60% by mass.

<<Other Photopolymerizable Monomer>>

Moreover, the following (meth)acrylates, (meth)acryl amides, and vinyl ethers can be used in combination as other photopolymerizable monomers, even through they have a problem of skin sensitization in some degrees as used alone, or skin sensitization thereof is not confirmed, as long as an ink as a whole does not have a problem.

Examples of other photopolymerizable monomers include ethylene glycol di(meth)acrylate, hydroxypivalic acid neopentyl glycol di(meth)acrylate, γ-butyrolactone acrylate, isobornyl(meth)acrylate, formulated trimethylol propane mono(meth)acrylate, polytetramethylene glycol di(meth) acrylate, trimethylol propane (meth)acrylic acid benzoate, diethylene glycol diacrylate, triethylene glycol di(meth) acrylate, tetraethylene glycol di(meth)acrylate, polyethylene glycol diacrylates [CH$_2$=CH—CO—(OC$_2$H$_4$)n-OCOCH=CH$_2$ (n≈4)], [CH$_2$=CH—CO—(OC$_2$H$_4$)n-OCOCH=CH$_2$ (n≈9)], [CH$_2$=CH—CO—(OC$_2$H$_4$)n-OCOCH=CH$_2$ (n≈14)], [CH$_2$=CH—CO—(OC$_2$H$_4$)n-OCOCH=CH$_2$ (n≈23)], dipropylene glycol di(meth)acrylate, tripropylene glycol di(meth)acrylate, polypropylene glycol dimethacrylate [CH$_2$=C(CH$_3$)—CO—(OC$_3$H$_6$)n-OCOCH(CH$_3$)=CH$_2$ (n≈7)], 1,3-butanediol di(meth)acrylate, 1,4-butanediol diacrylate, 1,6-hexanediol di(meth)acrylate, 1,9-nonanediol di(meth)acrylate, neopentyl glycol di(meth)acrylate, tricyclodecane dimethanol diacrylate, propylene oxide-modified bisphenol A di(meth)acrylate, polyethylene glycol di(meth)acrylate, dipentaerythritol hexa(meth)acrylate, (meth)acryloyl morpholine, 2-hydroxypropyl(meth)acryl amide, propylene oxide-modified tetramethylol methane tetra(meth)acrylate, dipentaerythritol hydrorxypent-a(meth)acrylate, caprolactone-modified dipentaerythritol hydroxypenta(meth)acrylate, ditrimethylol propane tetra(meth)acrylate, pentaerythritol tetra(meth)acrylate, trimethylol propane triacrylate, ethylene oxide-modified trimethylol propane triacrylate, propylene oxide-modified trimethylol propane tri(meth)acrylate, caprolactone-modified trimethylol propane tri(meth)acrylate, pentaerythritol tri(meth)acrylate, tris(2-hydroxyethyl) isocyanurate tri(meth)acrylate, ethoxylated neopentyl glycol di(meth)acrylate, propylene oxide-modified neopentyl glycol di(meth)acrylate, propylene oxide-modified glyceryl tri (meth)acrylate, polyester di(meth)acrylate, polyester tri (meth)acrylate, polyester tetra(meth)acrylate, polyester penta(meth)acrylate, polyester poly(meth)acrylate, N-vinyl caprolactam, N-vinyl pyrrolidone, N-vinyl formamide, polyurethane di(meth)acrylate, polyurethane tri(meth)acrylate, polyurethane tetra(meth)acrylate, polyurethane penta (meth)acrylate, polyurethane poly(meth)acrylate, cyclohexane dimethanol divinyl ether, cyclohexane dimethanol monovinyl ether, hydroxyethyl vinyl ether, diethylene glycol monovinyl ether, diethylene glycol divinyl ether, dicyclopentadiene vinyl ether, tricyclodecane vinyl ether, benzyl vinyl ether, and ethyloxtacene methyl vinyl ether.

<Other Components>

<<Photoradical Polymerization Initiator>>

The ink of the present invention preferably contains a photoradical polymerization initiator. The photoradical polymerization initiator is not appropriately selected depending on the intended purpose without any limitation, but the photoradical polymerization initiator is preferably selected from those negative for skin sensitization.

The photoradical polymerization initiator negative for skin sensitization is appropriately selected depending on the intended purpose without any limitation, provided that it is compounds of any of the skin sensitization evaluations (1) to (3), and examples thereof include 2-dimethylamino-2-(4-methylbenzyl)-1-(4-morpholin-4-yl-phenyl) butan-1-one, 2-methyl-1-[4-(methylthio)phenyl]-2-morpholinopropan-1-one, 2-benzyl-2-dimethylamino-1-(4-morpholinophenyl)butanone-1, and 2,4-diethyl thioxanthone. These may be used alone or in combination.

The (meth)acrylic acid ester, the (meth)acryl amide, and the vinyl ether are known to have cationic polymerization property as well. Photocationic polymerization initiators are generally expensive and generate a trace amount of a strong acid even in the state where they are not irradiated with light. Thus, it is necessary to take special cares such as imparting acid resistance to the ink supply channel of a printer, imposing limitation on the choice of the constituent members of the printer. In contrast, the ink of the present invention can contain the photoradical polymerization initiator that is inexpensive and generates no strong acid. Thus, it is possible to produce an ink at low cost, and also it is easy to choice the constituent members of a printer. Needless to say, when using quite high energy light source such as electron beams, α rays, β rays, γ rays or X rays, polymerization reaction proceeds without polymerization initiator. This is a conventionally known matter, and not described in detail in the present invention.

The photoradical polymerization initiator includes, for example, a self-cleaving photopolymerization initiator and a hydrogen-abstracting polymerization initiator.

Examples of the self-cleaving photopolymerization initiator include 2,2-dimethoxy-1,2-diphenylethan-1-one, 1-hydroxycyclohexyl phenyl ketone, 2-hydroxy-2-methyl-1-phenylpropan-1-one, 1-[4-(2-hydroxyethoxyl)-phenyl]-2-hydroxy-2-methyl-1-propan-1-one, 2-hydroxy-1-{4-[4-(2-hydroxy-2-methylpropionyl)benzyl]phenyl}-2-methyl-1-propan-1-one, phenylglyoxylic acid methyl ester, 2-methyl-1-[4-(methylthio)phenyl]-2-morpholinopropan-1-one, 2-benzyl-2-dimethylamino-1-(4-morpholinophenyl)butanone-1,2-dimethylamino-2-(4-methylbenzyl)-1-(4-morpholin-4-yl-phenyl) butan-1-one, bis(2,4,6-trimethylbenzoyl)phenylphosphine oxide, bis(2,6-dimethoxybenzoyl)-2, 4,4-trimethyl-pentylphosphine oxide, 2,4,6-trimethylbenzoylphosphine oxide, 1,2-octanedion-[4-(phenylthio)-2-(o-benzoyloxime)], ethanone-1-[9-ethyl-6-(2-methylbenzoyl)-9H-carbazol-3-yl]-1-(O-acetyloxime) and [4-(methylphenylthio)phenyl]phenylmethanone.

Examples of the hydrogen-abstracting polymerization initiator include: benzophenone compounds such as benzophenone, methylbenzophenone, methyl-2-benzoylbenzoate, 4-benzoyl-4'-methyldiphenyl sulfide and phenylbenzophenone; and thioxanthone compounds such as 2,4-diethylthioxanthone, 2-chlorothioxanthone, isopropylthioxanthone and 1-chloro-4-propylthioxanthone.

<<Polymerization Accelerator>>

Amines may be used as a polymerization accelerator in combination with the photoradical polymerization initiator.

Examples of the polymerization accelerator include p-dimethylaminobenzoate, 2-ethylhexyl p-dimethylaminobenzoate, methyl p-dimethylaminobenzoate, 2-dimethylaminoethyl benzoate and butoxyethyl p-dimethylaminobenzoate.

<<Colorant>>

The ink may contain a colorant, as desired. The colorant is appropriately selected from conventional inorganic pigments, organic pigment, and various color pigments (e.g. black pigments, yellow pigments, magenta pigments, cyan pigment, and white pigments) depending on the intended purpose without any limitation.

As for black pigments, those such as carbon black produced by the furnace method or the channel method can be used.

As for yellow pigments, for example, the following Pig. Yellow series pigments can be used: Pig. Yellow 1, Pig. Yellow 2, Pig. Yellow 3, Pig. Yellow 12, Pig. Yellow 13, Pig. Yellow 14, Pig. Yellow 16, Pig. Yellow 17, Pig. Yellow 73, Pig. Yellow 74, Pig. Yellow 75, Pig. Yellow 83, Pig. Yellow 93, Pig. Yellow 95, Pig. Yellow 97, Pig. Yellow 98, Pig. Yellow 114, Pig. Yellow 120, Pig. Yellow 128, Pig. Yellow 129, Pig. Yellow 138, Pig. Yellow 150, Pig. Yellow 151, Pig. Yellow 154, Pig. Yellow 155, and Pig. Yellow 180.

As for magenta pigments, for example, the following Pig. Red series pigments can be used: Pig. Red 5, Pig. Red 7, Pig. Red 12, Pig. Red 48 (Ca), Pig. Red 48 (Mn), Pig. Red 57 (Ca), Pig. Red 57:1, Pig. Red 112, Pig. Red 122, Pig. Red 123, Pig. Red 168, Pig. Red 184, Pig. Red 202, and Pig. Violet 19.

As for cyan pigments, for example, the following Pig. Blue series pigments can be used: Pig. Blue 1, Pig. Blue 2, Pig. Blue 3, Pig. Blue 15, Pig. Blue 15:3, Pig. Blue 15:4, Pig. Blue 16, Pig. Blue 22, Pig. Blue 60, Vat Blue 4, and Vat Blue 60.

As for the white pigment, for example, usable are sulfuric acid salts of alkaline earth metals such as barium sulfate, carbonic acid salts of alkaline earth metals such as calcium carbonate, silica such as fine silicic acid powder and synthetic silicic acid salts, calcium silicate, alumina, alumina hydrate, titanium oxide, zinc oxide, talc and clay.

In addition, various inorganic or organic pigments may optionally be used considering, for example, physical properties of the ink.

Furthermore, a polymerization inhibitor, a higher-fatty-acid, silicone or fluoro surfactant, or a polar group-containing polymeric pigment dispersing agent may optionally be used. Examples of the polymerization inhibitor include 4-methoxy-1-naphthol, methylhydroquinone, hydroquinone, t-butylhydroquinone, di-t-butylhydroquinone, methoquinone, 2,2'-dihydroxy-3,3'-di($\alpha$-methylcyclohexyl)-5,5'-dimethyldiphenyl methane, p-benzoquinone, di-t-butylbutyl diphenylamine, 9,10-di-n-butoxyanthracene, 4,4'-[1,10-di-oxo-1,10-decanediylbis(oxy)]bis[2,2,6,6-tetramethyl]-1-piperidinyloxy.

The physical properties of the ink are appropriately selected depending on the intended purpose without any limitation, but they are desirably matched to specification required for an inkjet ejection head as used. Various ejection heads are on the marked from numerous manufacturers, and among them, there are ejection heads having a function of adjusting temperature over a wide temperature range. Considering such market trends, the viscosity of the ink at temperature of 25° C. is preferably 2 mPa·s to 150 mPa·s. In the case where the ink is ejected at 25° C., the viscosity of the ink is preferably 5 mPa·s to 18 mPa·s. As mentioned earlier, it is possible to use the temperature adjustment function of the ejection head. In the case where the viscosity of the ink is too high at 25° C., the viscosity thereof can be reduced by optionally heating the head. Assuming that the heating condition is 60° C., in the aforementioned case, the viscosity of the ink at 60° C. is preferably 2 mPa·s to 20 mPa·s, more preferably 5 mPa·s to 18 mPa·s.

Accordingly, the low viscosity of the ink can be achieved as long as the viscosity of the ink falls into either a range of 5 mPa·s to 18 mPa·s at 25° C., or a range of 2 mPa·s to 20 mPa·s at 60° C.

The light dose required for curing is appropriately selected depending on the intended purpose without any limitation, but the less energy is more preferable in view of energy saving. When the ink is designed to cure with radiation of very weak light, the ink is reacted with light leaked from a light source or light from indoor lighting to cure at a gas-liquid interface of the ink in an inkjet nozzle of the ejection head, which may cause clogging of the nozzle. It is often a case that this problem can be avoided by optimizing a design of a printer, but in any case, it is not preferable that the ink has high reactivity for curing. Accordingly, the light dose required for curing is preferably 5 mJ/cm$^2$ to 10,000 mJ/cm$^2$, more preferably 10 mJ/cm$^2$ to 1,000 mJ/cm$^2$, and even more preferably 10 mJ/cm$^2$ to 200 mJ/cm$^2$. When the light dose required for curing is within the aforementioned preferable range, it can be said that the curing property of the ink is improved.

(Ink Cartridge)

The ink cartridge of the present invention contains the photopolymerizable inkjet ink of the present invention, and a container, and may further contain other members, such as an ink bag, if necessary.

The ink of the present invention is housed in the container, which can be used as an ink cartridge. With this form, users do not have to directly touch the ink during works such as exchange of the ink, and thus they are not concerned with staining of their fingers, hands or clothes. In addition, it is possible to prevent interfusion of foreign matter such as dust into the ink.

The container is not particularly limited, and the shape, structure, size and material thereof may be appropriately selected depending on the intended purpose. For example, the container is preferably selected from those having at least an ink bag formed of an aluminum laminate film, or a resin film.

Figure 2:
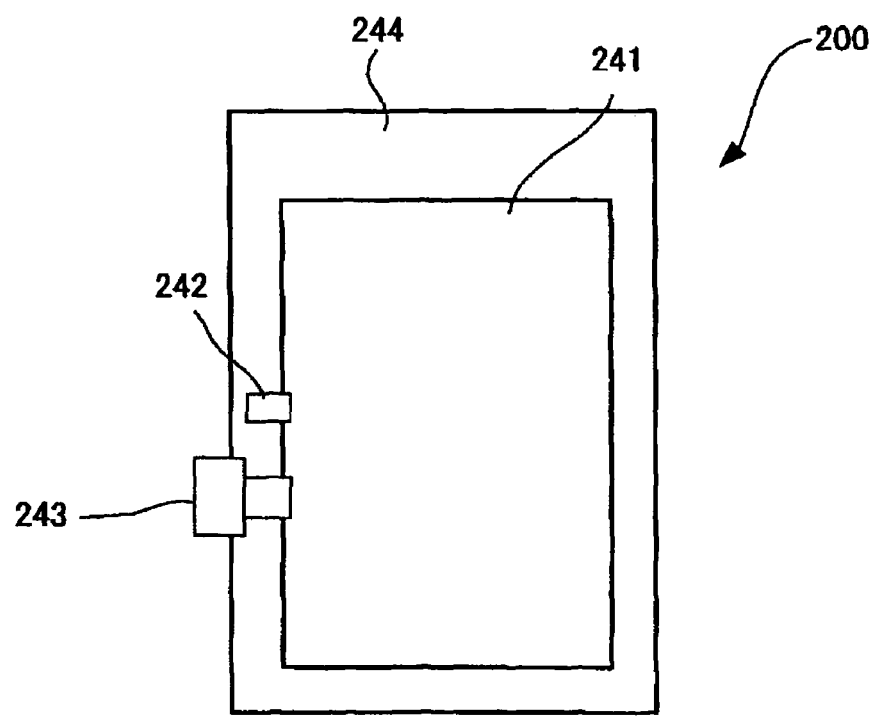
FIG. 2 is a schematic diagram illustrating one example of the ink cartridge of the present invention housing an ink bag.

The ink cartridge will be described referring to FIGS. 1 and 2. FIG. 1 is a schematic diagram illustrating an example of an ink bag 241 of an ink cartridge. FIG. 2 is a schematic diagram illustrating an ink cartridge 200 containing the ink bag 241 illustrated in FIG. 1 and a cartridge case 244, which is one example of the container, and houses the ink bag 241.

As illustrated in FIG. 1, the ink bag 241 is filled with the ink by injecting the ink from an ink inlet 242. After removal of air present inside the ink bag 241, the ink inlet 242 is sealed by fusion bonding. At the time of use, a needle attached to the main body of the device is inserted into an ink outlet 243 formed of a rubber member to supply the ink to the device therethrough. The ink bag 241 is formed of a wrapping member such as an air non-permeable aluminum laminate film. As illustrated in FIG. 2, the ink bag 241 is typically housed in a plastic cartridge case 244, which is then detachably mounted in use to various inkjet recording devices as the ink cartridge 200.

The ink cartridge of the present invention is preferably detachably mounted to inkjet recording devices. The ink cartridge can simplify the refill and exchange of the ink to improve workability.

(Inkjet Recording Device)

The inkjet recording device of the present invention contains at least an ink applying unit configured to apply a photopolymerizable inkjet ink on a base material to be printed, and may further contain other units such as an ink curing unit configured to cure the ink on the base material to be printed, if necessary.

The photopolymerizable inkjet ink is the photopolymerizable inkjet ink of the present invention. Moreover, the ink applying unit preferably contain the ink cartridge of the present invention mounted therein.

Figure 3:
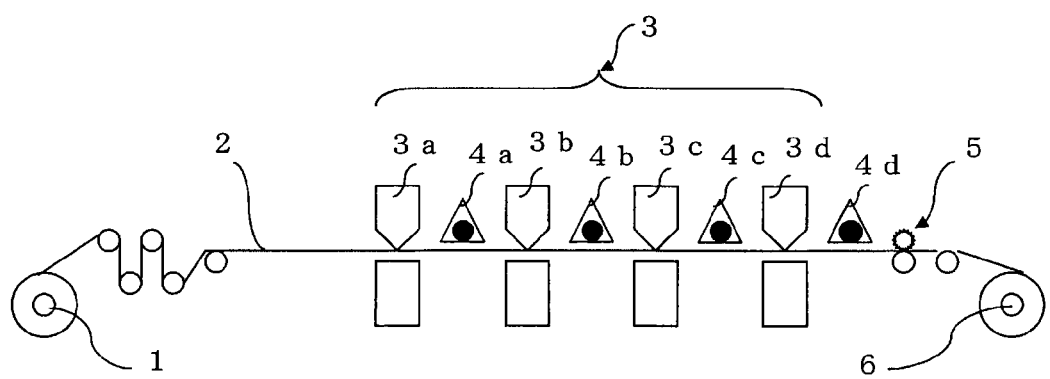
FIG. 3 is a schematic diagram illustrating one example of the inkjet recording device (printer) of the present invention.

FIG. 3 is a schematic diagram illustrating one example of the inkjet recording device (printer) of the present invention.

FIG. 3 illustrates an example that forms a color image in the following manner. Specifically, printing units 3 (i.e., printing units 3a, 3b, 3c and 3d for respective colors (e.g., yellow, magenta, cyan, and black) eject color inks (yellow, magenta, cyan and black) on a base material to be printed 2 (which is conveyed from left to right in FIG. 3, and may be referred to as "base" hereinafter) fed from a base material feed roller 1, and light (UV rays) is applied from UV light sources (curing light sources) 4a, 4b, 4c and 4d to the corresponding color inks for curing. Each of the printing units 3a, 3b, 3c and 3d has a heating mechanism at an ink ejecting portion thereof, and a cooling mechanism at a base holding portion thereof (i.e., a portion above or under the base in FIG. 3). The heating mechanism serves to heat an ink with a high viscosity so as to decrease its viscosity. The cooling mechanism serves to cool the base to about room temperature in a contact or non-contact manner, if necessary. In the case where the ink is heated for ejection, when the printing area of the previously printed color is small and the conveyance speed of the base is low, the base material is naturally cooled and kept at about room temperature in the subsequent printing. However, when the printing area of the previously printed color is large and the conveyance speed of the base is high, the base increases in temperature to potentially cause variation between the respective color inks in behaviors such as wetting and spreading of the ink droplets that have been jetted onto the base or the previously jetted ink, to thereby adversely affect image formation. Thus, if necessary, the cooling mechanism may be provided for keeping a base at about room temperature.

The base material 2 used is, for example, paper, a film, a metal or a composite material thereof. The base material 2 illustrated in FIG. 3 is a roll but may be a sheet. In addition, the base material may be subjected to double-side printing as well as single-side printing.

When UV rays are applied to each of the color inks for every printing process, the color inks are satisfactorily cured. In order to achieve high-speed printing, the UV light sources 4a, 4b and 4c may be lowered in output power or may be omitted, so that the UV light source 4d is made to apply a sufficient dose of UV rays to a composite printed image formed of a plurality of colors. In addition, for realizing energy saving and cost reduction, LED light sources, which have recently been used practically for printing of photopolymerizable inks, may be used instead of conventionally used light sources such as high-pressure mercury lamps and metal halide lamps. In FIG. 3, reference numeral 5 denotes a processing unit and reference numeral 6 denotes a wind-up roll for printed products.

EXAMPLES

The present invention will next be described by way of Examples, which should not be construed as limiting the present invention thereto.

Examples 1 to 19

The materials of the following compound groups (A) to (C) were mixed together at the blending ratio (unit for the numeric value was parts by mass) of the corresponding columns of Examples and Comparative Examples shown in Table 3, to thereby obtain inks.
Compound group (A): (meth)acrylic acid ester and/or (meth)acryl amide, which is negative for skin sensitization (of high viscosity, but excellent curing property)
Compound group (B): (meth)acrylic acid ester and/or (meth)acryl amide, which is negative for skin sensitization (of low viscosity)
Compound group (C): triethylene glycol divinyl ether, t-butyl methacrylate, n-pentyl methacrylate, and n-hexyl methacrylate, each of which are negative for skin sensitization (of sufficiently low viscosity)
Compound group (D): photoradical polymerization initiator negative for skin sensitization The details of A1 to A8, B1 to B5, C1 to C4, and D1 to D4 in Table 3 are as follows. The value in parentheses after each product name is "SI value" as measured by the LLNA test described in the above skin sensitization evaluation (1). The description "negative for skin sensitization" or "no skin sensitization" after each product name means that the product is evaluated as "negative for skin sensitization" or "no skin sensitization" in the MSDS (Material Safety Data Sheet) described in the above skin sensitization evaluation (2) or the literature described in the above skin sensitization evaluation (3), and MSDS or literature used for the evaluation standard, and the test method used are also depicted.

The evaluation method of the SI value will be described below in detail.
A1: Caprolactone-modified dipentaerythritol hexaacrylate, DPCA-60, manufactured by NIPPON KAYAKU Co. Ltd. (negative for skin sensitization, evaluated in MSDS, test method: OECD test guideline 406)
A2: Polyethoxylated tetramethylol methane tetraacrylate, ATM-35E (1.7), manufactured by Shin-Nakamura Chemical Co., Ltd.
A3: Ethylene oxide-modified bisphenol A diacrylate, BPE-10 (1.2), manufactured by Dai-ichi Kogyo Seiyaku Co., Ltd.
A4: Caprolactone-modified neopentylglycol hydroxypivalate diacrylate, HX-620 (0.9), manufactured by NIPPON KAYAKU Co. Ltd.
A5: Polypropylene glycol diacrylate [$CH_2$=CH—CO—($OC_3H_6$)n-OCOCH=$CH_2$ (n≈12)], M-270 (1.5), manufactured by Toagosei Chemical CO., LTD.
A6: Hydroxyethyl acryl amide, HEAA manufactured by KOHJIN Co., Ltd. (no skin sensitization, evaluated in MSDS, test method: OECD test guideline 429)
A7: Trimethylol propane trimethacrylate, SR350 (1.9), manufactured by Sartomer Co.
A8: Tricyclodecane dimethanol dimethacrylate, DCP (1.3), manufactured by Shin-Nakamura Chemical Co., Ltd.
B1: Ethylene oxide-modified phenol acrylate, M-102 (0.7), manufactured by Toagosei Chemical CO., LTD.
B2: Isostearyl acrylate, S-1800A (1.4), manufactured by Shin-Nakamura Chemical Co., Ltd.
B3: Ethylene oxide-modified trimethylol propane trimethacrylate, TMPT-3EO (1.0), manufactured by Shin-Nakamura Chemical Co., Ltd.
B4: Stearyl methacrylate, S (1.2), manufactured by Shin-Nakamura Chemical Co., Ltd.
B5: Glycerin dimethacrylate, 701 (1.2), manufactured by Shin-Nakamura Chemical Co., Ltd.
C1: Triethylene glycol divinyl ether, manufactured by BASF (negative for skin sensitization, evaluated in MSDS, test method: OECD test guideline 406)
C2: t-Butyl methacrylate, Light Ester TB, manufactured by KYOEISHA CHEMICAL CO., LTD. (negative for skin sensitization, evaluated in the literature: Contact Dermtitis 8 223-235 (1982), test method: maximization)
C3: n-Pentyl methacrylate, manufactured by Tokyo Science Corp. (negative for skin sensitization, evaluated in the literature: Contact Dermtitis 8 223-235 (1982), test method: maximization)
C4: n-Hexyl methacrylate, TOKYO CHEMICAL INDUSTRY CO., LTD. (negative for skin sensitization, evaluated in the literature: Contact Dermtitis 8 223-235 (1982), test method: maximization)
D1: 2-Dimethylamino-2-(4-methylbenzyl)-1-(4-morpholin-4-yl-phenyl)butan-1-one (no skin sensitization, evaluated in MSDS, test method: OECD test guideline 406)
D2: 2-Methyl-1-[4-(methylthio)phenyl]-2-morpholinopropan-1-one (no skin sensitization, evaluated in MSDS, test method: OECD test guideline 406)
D3: 2-Benzyl-2-dimethylamino-1-(4-morpholinophenyl) butanone-1 (no skin sensitization, evaluated in MSDS, test method: OECD test guideline 406)

D4: Equimolar mixture of 2,4-diethyl thioxanthone (1.4) and p-dimethylaminobenzoic acid-2-ethylhexyl (no skin sensitization, evaluated in MSDS, test method: OECD test guideline 406)

<Measuring Method of SI Value>

According to the skin sensitization test based on the LLNA (Local Lymph Node Assay), the SI value was measured in the below described manner.

[Test Material]

<<Positive Control>>

α-Hexylcinnamaldehyde (HCA; product of Wako Pure Chemical Industries, Ltd.) was used as the positive control.

<<Vehicle>>

The vehicle used was a mixture containing the below-listed acetone and olive oil in a ratio by volume of 4/1.

Acetone (product of Wako Pure Chemical Industries, Ltd.)

Olive oil (product of Fudimi Pharmaceutical Co., Ltd.)

<<Animals Used>>

Before treated with the test substances, the positive control or the vehicle control, female mice were acclimated for 8 days including 6-day quarantine. No abnormalities were found in all the animals during the quarantine/acclimation period. Based on the body weights measured 2 days before the initiation of sensitization, they were categorized into 2 groups (4 mice/group) by the body weight stratified random sampling method so that the body weight of each individual was within ±20% of the average body weight of all the individuals. Each animal was 8 weeks old to 9 weeks old at the time of the initiation of sensitization. The animals remaining after the categorization were excluded from the test.

The animals were individually identified by application of oil ink to their tale throughout the test period, and also their cages were labeled for identification.

<<Housing Environment>>

Throughout the housing period including the quarantine/acclimation period, the animals were housed in an animal room with barrier system, which was set as follows: 21° C. to 25° C. in temperature, 40% to 70% in relative humidity, 10 times/hour to 15 times/hour in frequency of air circulation, and 12 hours in lighting cycle (lighting from 7:00 to 19:00).

The housing cages used were those made of polycarbonate, and four animals were housed in each cage.

The animals were given ad libitum solid diet for laboratory animals MF (product of Oriental Yeast Co., Ltd.). Also, using a water-supply bottle, they were given ad libitum tap water in which sodium hypochlorite (PURELOX, product of OYALOX Co., Ltd.) had been added so that the chlorine concentration was about 5 ppm. Bedding used was SUN-FLAKE (fir tree, shavings obtained with a power planer) (product of Charles River Inc.). The diet and feeding equipment were sterilized with an autoclave (121° C., 30 min) before use.

The cage and bedding were replaced with new ones at the times of the categorization and the removal of the auricular lymph node (i.e., the time when the animals were transferred from the animal room), and the water-supply bottle and rack were replaced with new ones at the time of the categorization.

[Test Method]

<<Group Composition>>

The group composition used for the measurement of the Si value is shown in Table 1.

TABLE 1

| Test group | Sensitization substance | Sensitization dose (μL/auricle) | Times of sensitization | Number of animals (animal No.) |
| --- | --- | --- | --- | --- |
| Vehicle control group | Vehicle only | 25 | Once/day × 3 days | 4 (1-4) |
| Positive control group | 25.0% HCA | 25 | Once/day × 3 days | 4 (5-8) |

[Preparation]

<<Test Substance>>

Table 2 shows the amount of the test substance. The test substance was weighed in a measuring flask, and the volume of the test substance was adjusted to 1 mL with a vehicle. The thus-prepared solution was placed in a light-shielded airtight container (made of glass).

TABLE 2

| | Concentration after adjustment (w/v %) | Mass of test substance (g) |
| --- | --- | --- |
| Test substance | 50.0 | 0.5 |

<<Positive Control Substance>>

About 0.25 g of HCA was accurately weighed, and a vehicle was added to the HCA to have the volume of 1 mL, to thereby prepare a 25.0 w/v % solution. The thus-prepared solution was placed in a light-shielded airtight container (made of glass).

<<BrdU>>

In a measuring flask, 200 mg of 5-bromo-2'-deoxyuridine (BrdU, product of NACALAI TESQUE, INC.) was accurately weighed. Then, physiological saline (product of OTSUKA PHARMACEUTICAL CO., LTD.) was added to the measuring flask, and dissolved through application of ultrasonic waves. The volume of the resultant solution was adjusted to 20 mL to prepare a 10 mg/mL solution (BrdU preparation). The thus-prepared solution was sterilized through filtration with a sterilized filtration filter and placed in a sterilized container.

<<Preparation Day and Storage Period>>

The positive control preparation was prepared on the day before the initiation of sensitization, and stored in a cold place except in use. The vehicle and the test substance preparations were prepared on the day of sensitization. The BrdU solution was prepared 2 days before administration and stored in a cold place until the day of administration.

[Sensitization and Administration of BrdU]

<<Sensitization>>

Each (25 μL) of the test substance preparations, the positive control preparation or the vehicle was applied to both the auricles of each animal using a micropipettor. This treatment was performed once a day for three consecutive days.

<<Administration of BrdU>>

About 48 hours after the final sensitization, the BrdU preparation (0.5 mL) was intraperitoneally administered once to each animal.

[Observation and Examination]
<<General Conditions>>
All the animals used for the test were observed once or more times a day from the day of the initiation of sensitization to the day of the removal of the auricular lymph node (i.e., the day when the animals were transferred from the animal room). Notably, the observation day was counted from the day of the initiation of sensitization being regarded as Day 1.
<<Measurement of Body Weights>>
The body weight of each animal was measured on the day of the initiation of sensitization and on the day of the removal of the auricular lymph node (i.e., the day when the animals were transferred from the animal room). Also, the average of the body weights and the standard error thereof were calculated for each group.
<<Removal of Auricular Lymph Node and Measurement of Mass Thereof>>
About 24 hours after the administration of BrdU, the animals were allowed to undergo euthanasia, and their auricular lymph nodes were sampled. The surrounding tissue of each auricular lymph node was removed, and the auricular lymph nodes from both the auricles were collectively weighed. Also, the average of the weights of the auricular lymph nodes and the standard error thereof were calculated for each group. After the measurement of the weights, the auricular lymph nodes of each individual were stored in a frozen state using a BIO MEDICAL FREEZER set to −20° C.
<<Measurement of BrdU Intake>>
After returned to room temperature, the auricular lymph nodes were mashed with the gradual addition of physiological saline, and suspended therein. The thus-obtained suspension was filtrated and then dispensed into the wells of a 96-well microplate, with 3 wells being used per individual. The thus-dispensed suspensions were measured for intake of BrdU by the ELISA method. The reagents used were those of a commercially available kit (Cell Proliferation ELISA, BrdU colorimetric, Cat. No. 1647229, product of Roche Diagnostics Inc.). A multiplate reader (FLUOSTAR OPTIMA, product of BMG LABTECH Inc.) was used to measure the absorbance of each well (OD: 370 nm to 492 nm, the intake of BrdU), and the average of the absorbance of the 3 wells for each individual was used as the measurement of BrdU for the individual.
[Evaluation of Results]
<<Calculation of Stimulation Index (SI)>>
As shown in the following formula, the measurement of BrdU intake for each individual was divided by the average of the measurements of BrdU intake in the vehicle control group to calculate the SI value for the individual. The SI value of each test group was the average of the SI values of the individuals. Also, the standard error of the SI values was calculated for each test group. Notably, the SI value was rounded at the second decimal place and shown to the first decimal place.

$$SI = \frac{\text{Average of measurements of } BrdU \text{ intake for each individual (average of 3 wells)}}{\text{Average of measurements of } BrdU \text{ intake in the vehicle control group (average of 4 animals)}}$$

Each of the above-prepared inks was measured for viscosities (mPa·s) at 25° C. and 60° C., and light dose required for curing (mJ/cm$^2$). The results are shown in Table 3.

The viscosities at 25° C. and 60° C. were measured with a cone-plate-type rotary viscometer (product of TOKI SANGYO CO., LTD.) with the temperature of circulating water being constantly set to 25° C. and 60° C. The temperature of 25° C. is a temperature generally considered room temperature. The temperature of 60° C. is a temperature set considering the specification of a commercially available inkjet ejection head, such as GEN4 (product of Ricoh Printing Systems, Ltd.), that can be heated.

The curing property of the inks was evaluated as follows. Specifically, each ink was jetted on a commercially available polyethylene terephthalate (PET) film and irradiated with light using a UV irradiating device LH6 (product of Fusion Systems Japan Co., Ltd.).

An aluminum pouch bag having a shape illustrated in FIG. 1 was charged with the ink, and hermetically sealed so as to avoid inclusion of air bubbles. The hermetically sealed pouch bag containing the ink was housed in a plastic cartridge as illustrated in FIG. 2. This cartridge was mounted to a casing adapted for housing it. In the casing, an ink flow channel was provided from the cartridge to a GEN4 head (product of Ricoh Printing Systems, Ltd.). The ink was jetted through the ink flow channel to form, on the film, a solid coated film.

The thus-formed solid coated film was irradiated with light of the wavelength region corresponding to the UVA region, with the light dose being changed stepwise to 1,000, 500, 200, 100, 50, 20 and 10 (mJ/cm$^2$). Whether the solid coated film turned into the non-sticky state was judged by touching it with a finger, and the solid coated film was judged as being cured when it turned into the non-sticky state. The minimum integrated light dose required for curing the solid coated film is shown as the light dose required for curing. The inks that require less integrated light dose have better curing property.

TABLE 3

|   |          | Comp. Ex. | Example |    |    |    |    |    |    |    |    |
|---|----------|-----------|---------|----|----|----|----|----|----|----|----|
|   | Material | 1         | 1       | 2  | 3  | 4  | 5  | 6  | 7  | 8  | 9  |
| A | A1       | 15        | 15      | 10 | 10 | 10 | 5  |    |    |    |    |
|   | A2       |           |         |    |    |    |    | 10 |    |    |    |
|   | A3       |           |         |    | 5  | 5  | 5  |    |    |    |    |
|   | A4       |           |         |    |    |    |    | 5  |    |    |    |
|   | A5       | 85        |         |    |    |    | 5  |    |    |    | 5  |
|   | A6       |           |         | 5  |    |    |    |    |    | 5  |    |
|   | A7       |           |         |    |    |    |    |    | 50 | 40 | 40 |
|   | A8       |           |         |    |    |    |    |    |    | 5  | 5  |

TABLE 3-continued

| | | | | | | | | | | | |
|---|---|---|---|---|---|---|---|---|---|---|---|
| B | B1 | | 85 | 85 | 80 | 80 | 85 | 85 | | | |
| | B2 | | | | 5 | | | | | | |
| | B3 | | | | | | | | 45 | 50 | 45 |
| | B4 | | | | | | | | 5 | | |
| | B5 | | | | | 5 | | | | | 5 |
| C | C1 | | | | | | | | | | |
| | C2 | | | | | | | | | | |
| | C3 | | | | | | | | | | |
| | C4 | | | | | | | | | | |
| D | D1 | 10 | 10 | 10 | 10 | 10 | 10 | 10 | 20 | 20 | 20 |
| | D2 | | | | | | | | | | |
| | D3 | | | | | | | | | | |
| | D4 | | | | | | | | | | |
| Carbon black*² | | | | | | | | | | | |
| Viscosity (25° C.) | | 120 | 67 | 61 | 59 | 61 | 56 | 60 | 130 | 133 | 132 |
| Viscosity (60° C.) | | 30 | 14 | 12 | 12 | 12 | 11 | 13 | 15 | 15 | 15 |
| Ejection tem. from head (° C.) | | 60 | 60 | 60 | 60 | 60 | 60 | 60 | 60 | 60 | 60 |
| Light dose for curing | | *1 | 50 | 50 | 50 | 50 | 100 | 100 | 1,000 | 1,000 | 1,000 |

| | | Example | | | | | | | | | |
|---|---|---|---|---|---|---|---|---|---|---|---|
| | Material | 10 | 11 | 12 | 13 | 14 | 15 | 16 | 17 | 18 | 19 |
| A | A1 | 15 | 15 | 15 | 40 | 40 | 40 | 40 | 40 | 15 | 40 |
| | A2 | | | | | | | | | | |
| | A3 | | | | | | | | | | |
| | A4 | | | | | | | | | | |
| | A5 | | | | | | | | | | |
| | A6 | | | | | | | | | | |
| | A7 | | | | | | | | | | |
| | A8 | | | | | | | | | | |
| B | B1 | 85 | 85 | 85 | 10 | 10 | 10 | 10 | 10 | 85 | 10 |
| | B2 | | | | | | | | | | |
| | B3 | | | | | | | | | | |
| | B4 | | | | | | | | | | |
| | B5 | | | | | | | | | | |
| C | C1 | | | | 50 | | | | 10 | | |
| | C2 | | | | | 50 | | | 40 | | 50 |
| | C3 | | | | | | 50 | | | | |
| | C4 | | | | | | | 50 | | | |
| D | D1 | | | | 10 | 5 | 5 | 5 | 5 | 10 | 5 |
| | D2 | 10 | | | | | | | | | |
| | D3 | | 10 | | | | | | | | |
| | D4 | | | 10 | | | | | | | |
| Carbon black*² | | | | | | | | | | 4 | 4 |
| Viscosity (25° C.) | | 64 | 69 | 62 | 40 | 12 | 13 | 15 | 14 | 78 | 14 |
| Viscosity (60° C.) | | 13 | 15 | 12 | 11 | 3 | 4 | 5 | 4 | 16 | 4 |
| Ejection tem. from head (° C.) | | 60 | 60 | 60 | 60 | 25 | 25 | 25 | 25 | 60 | 25 |
| Light dose for curing | | 100 | 50 | 200 | 100 | 20 | 50 | 100 | 50 | 50 | 20 |

*1: incapable of evaluating as ejection could not be carried out
*²Carbon black #10, manufactured by Mitsubishi Chemical Corporation, which is in the form of a mixture with a polymer dispersing agent S32000 manufactured by Lubrizol Japan Co., with the mass ratio of 3/1 (Carbon black #10/S32000). The amount of the carbon black above is a blending amount of Carbon black #10 in the aforementioned mixture.

It was confirmed from the comparison between Comparative Example 1 and Example 1 that the ink could not be ejected due to its high viscosity when the ink was composed of only the compounds of the compound group (A), but in the case where the ink contained the relatively low viscous compounds of the compound group (B), the ink was ejected without a problem by setting the head to the appropriate temperature, and the obtained solid image could be cured by light irradiation.

It was conformed from the comparison between Examples 1 to 6 that the viscosity and curing property could be controlled by appropriately adjusting the blending formulation, even in the case where different acrylates or acryl amides were included in the compound group (A), or in the case where different acrylates or methacrylates were included in the compound group (B). Since properties required for an ink are not limited to viscosity and curing property, and are diverse, such as image quality, various properties of image coated films, cost, and adaptability to a print process of an inkjet recording device, compounds can be appropriately selected to satisfy various requirements depending on the situation.

It was also confirmed that, in the case the compound group (A) and the compound group (B) in the ink were mainly composed of methacrylates, such as Examples 7 to 9, or in the case where acryl amide or acrylate was further contained in combination, curing property of such ink was less desirable compared to those of Examples 1 to 6, but the ink could be ejected as ink jets without a problem by setting the head to the appropriate temperature, and the obtained solid image could be cured by light irradiation.

It was confirmed that viscosity and curing property of the ink could be controlled when different types of the polymerization initiator was used, such as in Examples 1, 10 to 12.

Similar to the above, compounds can be appropriately selected to satisfy various requirements depending on the situation.

It was confirmed that, even in the case where one compound or a combination of compounds of the compound group (C) was used, such as in Examples 13 to 17, the ink could be ejected as inkjets without a problem by setting the heat to the appropriate temperature, and the obtained solid image could be cured by light irradiation. Especially in the case where t-butyl methacrylate, n-pentyl methacrylate, or n-hexyl methacrylate is used rather than vinyl ether, both low viscosity and high curing property of the ink could be achieved better, but methacrylate also has unique odor. Taking this matter into consideration, as mentioned earlier, compounds can be appropriately selected to satisfy various requirements depending on the situation.

It was confirmed that, even in the case where the ink contained a colorant, such as in Examples 18 and 19, as long as the ink contained the relatively low viscous compound of the compound group (B), or further contained the compound of the compound group (C), the ink could be ejected by setting the heat to the appropriate temperature, and the obtained solid image could be cured by light irradiation.

Embodiments of the present invention are, for example, as follows:

<1> A photopolymerizable inkjet ink, containing:
photopolymerizable monomers containing at least one selected from the following compound group (A) compounds of which are negative for skin sensitization, and at least one selected from the following compound group (B) compounds of which are negative for skin sensitization,
wherein the compound group (A) is a compound group consisting of caprolactone-modified dipentaerythritol hexaacrylate, polyethoxylated tetramethylol methane tetraacrylate, ethylene oxide-modified bisphenol A diacrylate, caprolactone-modified hydroxy pivalic acid neopentyl glycol diacrylate, polypropylene glycol diacrylate [$CH_2$=CH—CO—($OC_3H_6$)n-OCOCH=$CH_2$ (n≈12)], hydroxyethyl acryl amide, trimethylol propane trimethacrylate, and tricyclodecane dimethanol dimethacrylate, and
the compound group (B) is a compound group consisting of ethylene oxide-modified phenolacrylate, isostearyl acrylate, ethylene oxide-modified trimethylol propane trimethacrylate, stearyl methacrylate, and glycerin dimethacrylate.

<2> The photopolymerizable inkjet ink according to <1>, wherein an amount of the compound group (A) in the photopolymerizable monomers is 10% by mass to 50% by mass.

<3> The photopolymerizable inkjet ink according to any of <1> or <2>, wherein an amount of the compound group (B) in the photopolymerizable monomers is 10% by mass to 85% by mass.

<4> The photopolymerizable inkjet ink according to any one of <1> to <3>, wherein a blending ratio of the compound group (A) and the compound group (B), which is expressed by a mass ratio of (A)/(B), is 15/85 to 85/15.

<5> The photopolymerizable inkjet ink according to any one of <1> to <4>, wherein the photopolymerizable monomers further contain at least one selected from the following compound group (C) compounds of which are negative for skin sensitization,
where the compound group (C) is a compound group consisting of triethylene glycol divinyl ether, hydroxybutyl vinyl ether, ethyl vinyl ether, t-butyl methacrylate, n-pentyl methacrylate, and n-hexyl methacrylate.

<6> The photopolymerizable inkjet ink according to any one of <1> to <5>, further comprising a photoradical polymerization initiator.

<7> The photopolymerizable inkjet ink according to <6>, wherein the photoradical polymerization initiator is at least one selected from the group consisting of 2-dimethylamino-2-(4-methylbenzyl)-1-(4-morpholin-4-yl-phenyl) butan-1-one, 2-methyl-1-[4-(methylthio)phenyl]-2-morpholinopropan-1-one, and 2-benzyl-2-dimethylamino-1-(4-morpholinophenyl)butanone-1,2,4-diethyl thioxanthone.

<8> An ink cartridge, containing:
the photopolymerizable inkjet ink as defined in any one of <1> to <7>; and
a container housing the photopolymerizable inkjet ink.

<9> An inkjet recording device, comprising:
the photopolymerizable inkjet ink as defined in any one of <1> to <7>; and
an ink applying unit configured to apply the photopolymerizable inkjet ink on a base material to be printed.

REFERENCE SIGNS LIST

1: base material feed roller
2: base material to be printed
3: printing unit
3a: printing unit for a color ink
3b: printing unit for a color ink
3c: printing unit for a color ink
3d: printing unit for a color ink
4a: UV light source
4b: UV light source
4c: UV light source
4d: UV light source
5: processing unit
6: wind-up roll for printed products
200: ink cartridge
241: ink bag
242: ink inlet
243: ink outlet
244: cartridge case

The invention claimed is:

1. A polymerizable inkjet ink, comprising:
photopoymerizable monomers comprising a compound (A) that is negative for skin sensitization, a compound (B) that is negative for skin sensitization, and a photoradical polymerization initiator
wherein
the compound (A) is at least one compound selected from the group consisting of a caprolactone-modified dipentaerythritol hexaacrylate, a polyethoxylated tetramethylol methane tetraacrylate, an ethylene oxide-modified bisphenol A diacrylate, a caprolactone-modified hydroxy pivalic acid neopentyl glycol diacrylate, a polypropylene glycol diacrylate [$CH_2$=CH—CO—($OC_3H_6$)n-OCOCH=$CH_2$ (n≈12)], a hydroxyethyl acryl amide, a trimethylol propane trimethacrylate, and a tricyclodecane dimethanol dimethacrylate,
the compound (B) is at least one compound selected from the group consisting of an ethylene oxide-modified phenolacrylate, an isostearyl acrylate, and a glycerin dimethacrylate,
the photoradical polymerization initiator is 2,4-diethyl thioxanthone, and
the ink has a viscosity of from 2 to 150 mPa·s at a temperature of 25° C. and a viscosity of from 2 to 20 mPa·s at 60° C.

2. The polymerizable inkjet ink according to claim 1, wherein an amount of the compound (A) in the photopolymerizable monomers is 10% by mass to 50% by mass.

3. The polymerizable inkjet ink according to claim 2, wherein an amount of the compound (B) in the photopolymerizable monomers is 10% by mass to 85% by mass.

4. The polymerizable inkjet ink according to claim 3, wherein a blending ratio of the compound (A) and the compound (B), which is expressed by a mass ratio of (A)/(B), is in a range of 15/85 to 85/15.

5. The polymerizable inkjet ink according to claim 2, wherein a blending ratio of the compound (A) and the compound (B), which is expressed by a mass ratio of (A)/(B), is in a range of 15/85 to 85/15.

6. The polymerizable inkjet ink according to claim 2, wherein the photopolymerizable monomers further comprise a compound (C) that is negative for skin sensitization, where the compound (C) is at least one compound selected from the group consisting of triethylene glycol divinyl ether, hydroxybutyl vinyl ether, ethyl vinyl ether, t-butyl methacrylate, n-pentyl methacrylate, and n-hexyl methacrylate.

7. The polymerizable inkjet ink according to claim 1, wherein an amount of the compound (B) in the photopolymerizable monomers is 10% by mass to 85% by mass.

8. The polymerizable inkjet ink according to claim 7, wherein a blending ratio of the compound (A) and the compound (B), which is expressed by a mass ratio of (A)/(B), is in a range of 15/85 to 85/15.

9. The polymerizable inkjet ink according to claim 7, wherein the photopolymerizable monomers further comprise a compound (C) that is negative for skin sensitization, where the compound (C) is at least one compound selected from the group consisting of triethylene glycol divinyl ether, hydroxybutyl vinyl ether, ethyl vinyl ether, t-butyl methacrylate, n-pentyl methacrylate, and n-hexyl methacrylate.

10. The polymerizable inkjet ink according to claim 1, wherein a blending ratio of the compound (A) and the compound (B), which is expressed by a mass ratio of (A)/(B), is in a range of 15/85 to 85/15.

11. The polymerizable inkjet ink according to claim 10, wherein the photopolymerizable monomers further comprise a compound (C) that is negative for skin sensitization, where the compound (C) is at least one compound selected from the group consisting of triethylene glycol divinyl ether, hydroxybutyl vinyl ether, ethyl vinyl ether, t-butyl methacrylate, n-pentyl methacrylate, and n-hexyl methacrylate.

12. The polymerizable inkjet ink according to claim 1, wherein the photopolymerizable monomers further comprise a compound (C) that is negative for skin sensitization, where the compound (C) is at least one compound selected from the group consisting of triethylene glycol divinyl ether, hydroxybutyl vinyl ether, ethyl vinyl ether, t-butyl methacrylate, n-pentyl methacrylate, and n-hexyl methacrylate.

13. The polymerizable inkjet ink according to claim 1, wherein the compound (A) is at least one compound selected from the group consisting of a caprolactone-modified hydroxy pivalic acid neopentyl glycol diacrylate, a polypropylene glycol diacrylate [$CH_2=CH-CO-(OC_3H_6)n-OCOCH=CH_2$ ($n \approx 12$)], and a hydroxyethyl acryl amide.

14. The polymerizable inkjet ink according to claim 1, wherein a blending ratio of the compound (A) and the compound (B), which is expressed by a mass ratio of (A)/(B), is 15/85.

15. The polymerizable inkjet ink according to claim 1, wherein the polymerizable inkjet ink consists of materials that are negative for skin sensitization.

16. An ink cartridge, comprising:
a polymerizable inkjet ink; and
a container housing the polymerizable inkjet ink,
wherein the polymerizable inkjet ink comprises photopolymerizable monomers comprising a compound (A) that is negative for skin sensitization, a compound (B) that is negative for skin sensitization, and a photoradical polymerization initiator,
wherein
the compound (A) is at least one compound selected from the group consisting of a caprolactone-modified dipentaerythritol hexaacrylate, a polyethoxylated tetramethylol methane tetraacrylate, an ethylene oxide-modified bisphenol A diacrylate, a caprolactone-modified hydroxy pivalic acid neopentyl glycol diacrylate, a polypropylene glycol diacrylate [$CH_2=CH-CO-(OC_3H_6)n-OCOCH=CH_2$ ($n \approx 12$)], a hydroxyethyl acryl amide, a trimethylol propane trimethacrylate, and a tricyclodecane dimethanol dimethacrylate,
the compound (B) is at least one compound selected from the group consisting of an ethylene oxide-modified phenolacrylate, an isostearyl acrylate, and a glycerin dimethacrylate,
the photoradical polymerization initiator is 2,4-diethyl thioxanthone, and the ink has a viscosity of from 2 to 150 mPa·s at a temperature of 25° C. and a viscosity of from 2 to 20 mPa·s at 60° C.

17. An inkjet recording device, comprising:
a polymerizable inkjet ink; and
an ink applying unit configured to apply the polymerizable inkjet ink on a base material to be printed,
wherein the polymerizable inkjet ink comprises photopolymerizable monomers comprising a compound (A) that is negative for skin sensitization, a compound (B) that is negative for skin sensitization, and a photoradical polymerization initiator,
wherein
the compound (A) is at least one compound selected from the group consisting of a caprolactone-modified dipentaerythritol hexaacrylate, a polyethoxylated tetramethylol methane tetraacrylate, an ethylene oxide-modified bisphenol A diacrylate, a caprolactone-modified hydroxy pivalic acid neopentyl glycol diacrylate, a polypropylene glycol diacrylate [$CH_2=CH-CO-(OC_3H_6)n-OCOCH=CH_2$ ($n \approx 12$)], a hydroxyethyl acryl amide, a trimethylol propane trimethacrylate, and a tricyclodecane dimethanol dimethacrylate,
the compound (B) is at least one compound selected from the group consisting of an ethylene oxide-modified phenolacrylate, an isostearyl acrylate, and a glycerin dimethacrylate,
the photoradical polymerization initiator is 2,4-diethyl thioxanthone, and
the ink has a viscosity of from 2 to 150 mPa·s at a temperature of 25° C. and a viscosity of from 2 to 20 mPa·s at 60° C.

* * * * *